Figure 1:
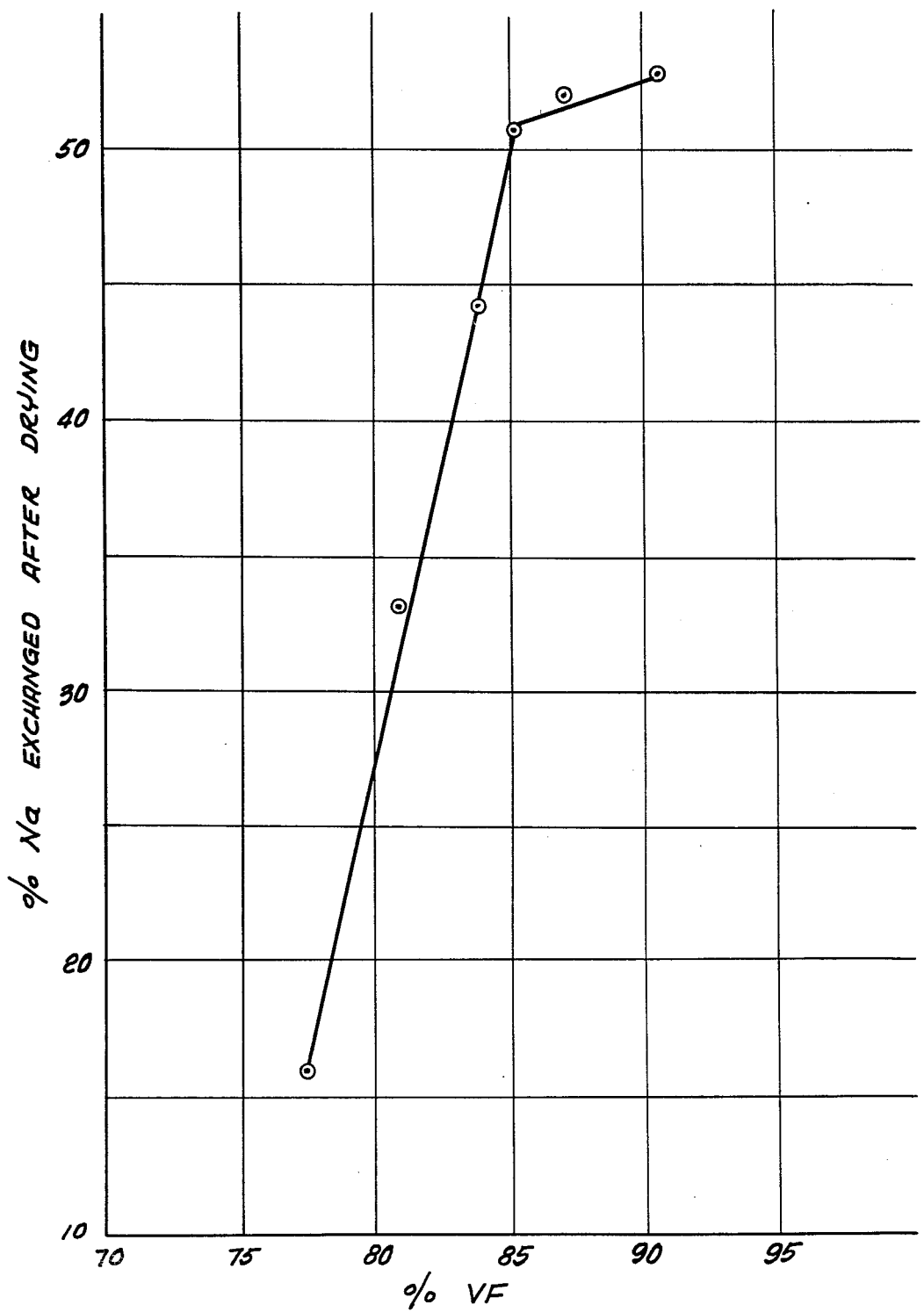

United States Patent [19]

Lim et al.

[11] Patent Number: 4,459,271

[45] Date of Patent: Jul. 10, 1984

[54] PROCESS FOR THE EXCHANGE OF CRYSTALLINE ZEOLITES

[75] Inventors: John Lim, Claremont; Michael Brady, Studio City; Adrian Humphries, Claremont, all of Calif.

[73] Assignee: Harshaw/Filtrol Partnership, Oakland, Calif.

[21] Appl. No.: 363,208

[22] Filed: Mar. 29, 1983

Related U.S. Application Data

[63] Continuation of Ser. No. 220,905, Dec. 29, 1980, abandoned.

[51] Int. Cl.$^3$ ............................................. C01B 33/28
[52] U.S. Cl. .................................................... 423/328
[58] Field of Search ............................... 423/328, 329; 252/455 Z; 502/60, 79

[56] References Cited

U.S. PATENT DOCUMENTS

| | | | |
|---|---|---|---|
| 3,402,996 | 9/1968 | Maher et al. | 423/328 |
| 3,595,611 | 7/1971 | McDaniel et al. | 423/328 |
| 3,607,043 | 9/1971 | McDaniel et al. | 423/328 |
| 3,677,698 | 7/1972 | Sherry et al. | 423/328 X |
| 4,125,591 | 11/1978 | Lindsley | 423/328 |
| 4,164,483 | 8/1979 | Alafandi et al. | 252/455 Z |
| 4,269,815 | 5/1981 | Lim et al. | 423/328 |

Primary Examiner—Edward J. Meros
Attorney, Agent, or Firm—Andrew E. Barlay

[57] ABSTRACT

This invention relates to exchanging the sodium contained in a crystalline zeolite by partially removing sodium by exchange with another cation, partially drying the exchanged zeolite and re-exchanging the dried zeolite.

3 Claims, 3 Drawing Figures

PROCESS FOR THE EXCHANGE OF CRYSTALLINE ZEOLITES

This is a continuation of application Ser. No. 220,905, filed Dec. 29, 1980, now abandoned.

It is generally recognized in the art of catalytic cracking with zeolitic catalysts which employ zeolites having exchange capacity which is in substantial amount satisfied by sodium, that the activity of the catalysts is impaired. The activity of the catalyst which has been subjected to a high temperature is the greater, the lower the sodium content of the catalyst.

Faujasite zeolites widely used in commercial cracking as formed contain about $0.9\pm0.2$ moles of $Na_2O$ per mole $Al_2O_3$ in the nominal formulas (Milton U.S. Pat. No. 2,882,224; Breck U.S. Pat. No. 3,120,007). Repeated exchanges of such zeolites at ambient temperature reaches an equilibrium value. (See Maher et al, U.S. Pat. No. 3,402,234.)

In order to reduce the sodium content to a substantially lower value, it has been found necessary in the prior art to heat activate the zeolite.

The procedure in the prior art in order to accomplish the reduction of the sodium content to values lower than those obtainable by repeated ambient temperature exchanges has been to employ multiple exchanges with intermediate separation, and washing of the partially exchanged zeolite. The several exchanges are conducted at elevated temperature in the range above about 180° F. to near boiling temperatures. The number of exchanges may be substantially reduced if one of the exchanges occurs at superatmospheric pressure (Sherry U.S. Pat. No. 3,304,234) and when all of the exchange is completed under superatmospheric pressure without intermediate separation of the partially exchanged zeolite (Alafandi, et al, U.S. Pat. Nos. 4,198,312; 4,088,069; 4,058,484).

An alternative procedure is to partially exchange the zeolite at near boiling temperature and then heat the separated zeolite to a temperature sufficient to modify the lattice of the zeolite and then repeatedly exchange the heated zeolite. The intermediate heating results in an exchanged crystal which has a substantially altered crystal lattice. It is said that such heating unlocks the sodium to facilitate in further exchange of the sodium (See Maher et al U.S. Pat. No. 3,402,234).

The exchanged zeolite must be heated so as to remove not only the water which is present between the crystallites, but also to substantially remove the remaining water which is termed "saturation" water (British Pat. No. 1,129,042). In order to reduce the sodium content to below 2% according to the above prior art (U.S. Pat. No. 3,402,234), it was found necessary to calcine the zeolite which had been subjected to three exchanges at near boiling, prior to calcination and then to subject the calcined zeolite to further repeated exchanges. The zeolite which has been exchanged at near boiling temperature is heated at 1000° F. or higher and then repeatedly exchanged at a near boiling temperatures. Such degree of heating results in a substantial change in the lattice of the zeolite. (See Maher et al U.S. Pat. No. 3,402,996 and Rabo "Zeolite Chemistry and Catalysts," ACS Monograph 171, pp 319 etc., and also McDaniel and Maher, the patentees of U.S. Pat. No. 3,402,996 appearing in "Molecular Sieves," p 186 etc., published in Society of Chemical Industries (1968)). Such degree of heating of an ammonium exchanged faujasite will produce an alteration in the exchange capacity, a process referred to as decationization (Rabo et al, U.S. Pat. No. 3,130,006).

STATEMENT OF THE INVENTION

We have found that the limitation of the exchange of the sodium below that presently attainable in the prior art in exchanges at ambient temperatures is associated with the degree of hydration of the zeolite.

We have discovered that a sodium Y zeolite which has been exchanged with a rear earth cation with or without exchange with other cations, other than an alkali metal cation, to reduce the sodium content to less than about 50% of the original sodium content of the sodium Y zeolite when dried at moderate temperatures to partially dry the zeolite that the sodium content may be reduced to below about 20% of the nominal original sodium content of the Y of $0.9\pm0.2$ moles of $Na_2O$ per mole of $Al_2O_3$. This we have been able to do by heating the zeolite so as to dry the zeolite to the region of about 85% to about 90% volatile free (VF). It is not necessary to heat the zeolite to a temperature required to "unlock" the sodium, or remove substantial portions of the water in the pores of the lattice, or decationize the zeolite as in the prior art. The reduction of sodium may be increased by repeated drying and re-exchange to $Na_2O$ content of 1% or less. The exchanges may be conducted at temperatures much lower than those required in the prior art to produce such exchange. In such exchanges the percent reduction of the sodium may range upward from about 40% of the sodium in the dried sample depending on the sodium content of the dried sample prior to re-exchange.

The reduction of sodium by an exchange prior to drying in the process of our invention includes exchange with rare earth cations alone or together with other cations under conditions to remove at least about 30% of the original sodium content, to wit to cations. Where the reduction of sodium includes cations other than rare earth, they are preferably monovalent cations, e.g. $NH_4$ or $H$ in amount sufficient together with the rare earth cations to cause the aforesaid reduction percentage.

The degree of drying of a faujasite according to our invention which is required to facilitate the further exchange of the residual sodium need not remove any substantial portion of the water above about 15% VF or less, i.e. about 85% or more. The removal of the water up to a percent VF in the range of about 85% to 90% VF has been found sufficient. The water thus removed appears to be held under forces substantially different from those which require heating to a VF percent substantially in excess of about 90% VF.

It is a surprising fact that if the drying is controlled so as to remove the water to the degree indicated that on rewetting the dried zeolite, when it is mixed with the salt solution used in the further exchange, the resistance to further exchange of sodium which was encountered in the initial exchange of the wet crystal aggregate is not reestablished.

The term volatile free (VF) is a well known term and its value is obtained by heating a wet body of particles such as crystallites until there is no further loss of weight. The term percent volatile free (%VF) of material containing volatile material is the weight of the sample after drying divided by the sample's original weight prior to drying times 100. Where the sample has some volatile material other than water, the percent volatile free includes the loss of such material other than water as well as water. The weight of a sample which is lost in arriving at the volatile free state is expressed as a percent of the initial weight of the sample, i.e. percent VM (volatile matter). The difference between the %VF and 100% is the %VM, i.e., volatile matter remaining in the sample. It has been established in the art that heating the zeolite for thirty minutes at 1050° F. followed by heating for thirty minutes at 1800° F. reduces the zeolite to a 100% VF state.

Where the zeolite contains $NH_4^+$ as well as rare earth cations, in order to determine the water content in the above loss of weight, the loss of $NH_3$ should also be determined in order to obtain the water loss on heating.

However, experience has shown as will be seen below, that the loss of weight in the examples which contain a material, e.g. $NH_4$ cation which is removed in the determination of the value of %VF, has but an unsubstantial effect on the value of the VF% which may therefor be accepted as the measure of the content of the water in the dried sample. Thus when, x = the weight % $NH_3$ on a volatile free basis
x(%VF) = the weight % $NH_3$ in the sample which is tested for volatile content
%W = the weight percent of the water sample which is tested for %VF
%VM = 100 − %VF = %W + X(%VF)
%W = %VM − x(%VF)

For purposes of this specification, we will define the content of the $H_2O$ in the sample before the determination of %VF as %WF.

%WF = 100 − %W

It is a surprising discovery that notwithstanding the prior art experience that high temperature exchanges are required, that if the intermediate heating be at a temperature merely sufficient to dry the zeolite to the range of about 85% to 90% VF, that all exchanges can be carried out at much lower temperatures than in the prior art.

This phenomenon is observed in the case of a faujasite type zeolite which is either exchanged only with rare earth or exchanged with a rare earth cation and with other cations prior to drying. It does not appear to any such degree to any such degree where the exchange before drying is only with a monovalent cations such as $NH_4$.

It is therefore our invention to partially exchange sodium containing zeolite with a rare earth salt or with a rare earth salt and other cations, other than alkali metal cations, for example $NH_4$ salt or with also a cation of the transition metals other than a rare earth metals such as has been used in the prior art exchange of faujasite zeolites. After partial reduction of the sodium content of the zeolite to dry the zeolite to the degree indicated, and then by a further exchange with one or more than one of the above cations to further reduce the sodium content. The exchanges instead of having to be conducted at elevated temperature may be conducted at ambient atmospheric temperatures, i.e. 70° ± 10° F.

The above discoveries are illustrated in the following example and plotted on FIGS. 1, 2 and 3.

EXAMPLE I

A sodium Y containing sodium equivalent to 13.3% $Na_2O$ based on the sodium Y, on a volatile free basis, had a surface area of 637 square meters per gram and the unit cell was 24.71 Angstroms. The sample was dispersed in water (13 grams of zeolite per 100 cc water). The pH of the slurry was adjusted to 5.5 with $H_2SO_4$, and upon the addition of ammonium sulphate (0.7 gram per gram sodium Y zeolite volatile free), and with subsequent stirring under ambient temperature conditions for one hour. The sodium content was reduced, after filtration and washing with deionized water, to 4.96% $Na_2O$ on a volatile free basis.

This material was subsequently treated, at the same solids content as before, with an aqueous solution of rare earth chloride containing about 10% by weight rare earth (rare-earth dosage was 10% based on the weight of the above ammonium-exchanged Y zeolite on a volatile free basis). The sodium content of the ammonium-rare earth-exchanged material (NR) was reduced to 3.62% $Na_2O$ on a volatile free basis. This NR material was then dried at about 100° C. for three hours, after which time its volatile free value was 90.6%. The dried material (NRD) was slurried in deionized water at 13% solids and a second rare earth exchange was performed in a manner identical to that described above. The final sodium content of this material (NRDR) was 1.71% $Na_2O$ on a volatile free basis (see Table I, Sample 1). The unit cell remained essentially unchanged at 24.71 Angstroms.

EXAMPLE II

The procedure of Example I was repeated. However, for samples 1 to 6 the drying was conducted for different lengths of time, resulting in different volatile free basis. The relationship of the volatile free values of the dried material (NRD) to the final sodium content of the subsequently rare-earth exchanged material (NRDR) is also shown in Table I. The present reduction in the sodium contect of the NRD material resulting from the drying and re-exchange indicates that while as a general principle the drier the zeolite above about 80% VF, the greater is the attainable percent reduction in the sodium content in the sample by subsequent exchange. The dehydration above about 80% permits of a substantially increased sodium removal which is in the region of about 85% to about 90% VF is substantively constant. There is a difference in the effect of volatile content below about 84% VF, i.e. 16% VM on the exchangeability of sodium as compared with a volatile content of about 10%.

TABLE I

| Sample No. | −1 | −2 | −3 | −4 | −5 | −6 |
|---|---|---|---|---|---|---|
| Chemical Composition, wt %, of NPD | | | | | | |
| % VF | 90.6 | 87.8 | 85.2 | 84.0 | 80.1 | 77.0 |
| % WF | 90 | 87 | 85 | 84 | 80 | 77 |
| $Na_2O$ | 3.62 | 3.46 | 3.71 | 3.60 | 3.66 | 3.62 |
| REO | 9.77 | 9.78 | 9.88 | 9.90 | 9.64 | 9.95 |
| $NH_3$ | 1.03 | 1.17 | 1.08 | 1.08 | 1.27 | 1.05 |
| Chemical Composition, wt %, of NRDR (on a volatile free basis) | | | | | | |
| $Na_2O$ | 1.71 | 1.66 | 1.83 | 2.0 | 2.44 | 3.04 |
| REO | 15.6 | 15.6 | 16.1 | 15.4 | 13.2 | 12.9 |
| $NH_3$ | 0.63 | 0.63 | 0.41 | 0.34 | 0.74 | 0.56 |
| Extent of $Na_2O$ Exchanges | | | | | | |
| % $Na_2O$ reduction | 1.91 | 1.80 | 1.88 | 1.60 | 1.22 | 0.58 |
| Final $Na_2O$ in NRDR as | | | | | | |
| % of initial $Na_2O$ in HDR | 52.8 | 52.0 | 50.7 | 44.4 | 33.3 | 16.0 |

The data of Table I plotted on FIG. 1 suggests that water in the form which is removed by drying up to a volatile content of about 85% VF has a substantially different effect on the ease of removal of sodium by exchange than does water which is associated with the zeolite which has a volatile content above about 85% VF. The effect of drying to a %VF in the range up to about 90% VF had a substantially greater effect on the removal of sodium than the removal of volatile matter to the %VF of substantially less than 85% VF. The percent removal of Na as attainable is substantially constant in the region of from about 85% VF to about 90% VF.

As will appear from the following, the sodium content of the sample which had been subjected to a single stage of drying and re-exchanged may be further reduced in sodium content by repeated drying and re-exchange under the above indicated conditions.

That the zeolite exchanged by the above procedures results in a substantial increase in the activity of the zeolite and that the calcination at high temperatures which result in changes in the lattice or result in decationization are not required is illustrated by the following Example III.

EXAMPLE III

A Y zeolite which has been exchanged with ammonium sulphate and rare earth salts as in Example I and having a percent VF value of 77.4% was dried to various levels of VF by the procedure of Example I as shown in Table II. The dried products were each re-exchanged with rare earth salt as in Example I to produce a zeolite (NRDR) of various sodium contents (expressed as weight % of the equivalent $Na_2O$ on a volatile free basis). Each of the zeolite were analyzed and x-rayed. The resultant zeolite is identified as NRDR. The results are tabulated in Table II.

TABLE II

| Sample No. | | 1 | 2 | 3 | 4 |
|---|---|---|---|---|---|
| Chemical Composition of Zeolite (NRDR): | | | | | |
| | % VF | 90.6 | 85.2 | 80.1 | 77.4 |
| | Unit Cell Å | 24.728 | 24.724 | 24.719 | 24.719 |
| NRDR | $Na_2O$ % | 1.79 | 1.70 | 2.50 | 2.80 |
| | REO % | 16.4 | 16.1 | 13.6 | 14.0 |
| | $NH_3$ % | 0.69 | 0.57 | 0.81 | 0.57 |

It will be seen that the unit cell dimension ($A_o$) remains unaltered in the drying process, thus showing no alteration in the lattice structure or change in the $SiO_2/Al_2O_3$ ratio of the zeolite.

EXAMPLE IV

Zeolites produced as in samples 1, 2, 3 and 4 of Example III were formulated into a cracking catalyst according to the prodecure described in the Lim et al U.S. Pat. No. 4,086,187. The composition of the spray dried catalyst on a volatile free basis was:

NRDR = 18%
Alumina = 22%
Ball Clay = 54%
$SiO_2$* = 6%

Ammonium polysilicate was employed equivalent to the $SiO_2$ percentage tested above.

| | Starting Material (NRD) | | | |
|---|---|---|---|---|
| Sample No. | 1 | 3 | 5 | 6 |
| Catalytic Properties: | Conv. Vol. % | | | |
| M | 75.2 | 77.7 | 75.3 | 73.1 |
| S | 67.8 | 66.5 | 64.1 | 62.4 |

| | Starting Material (NRD) | | | |
|---|---|---|---|---|
| Sample No. | 1 | 3 | 5 | 6 |
| S+ | 43.3 | 37.7 | 36.5 | 33.6 |

Figure 2:
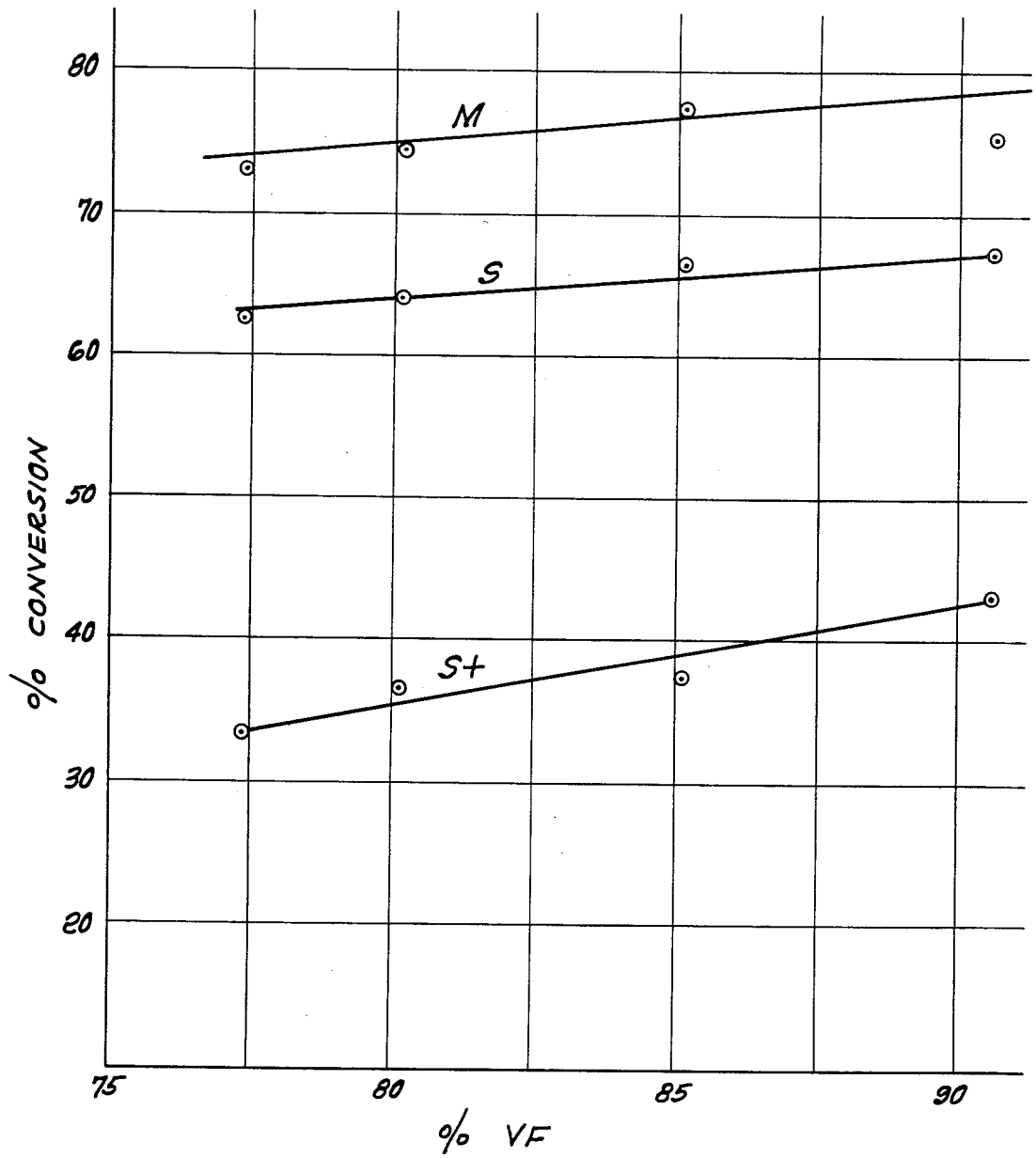

The activity of the various samples is plotted on FIG. 2.

The activity of the NRDR containing various percents VF before drying is tabulated below and plotted in FIG. 1. It will be seen that there is a sharp difference in the effect of drying up to about 85% to 90% as compared with drying above about 90% VF.

EXAMPLE V

A Y zeolite which had been exchanged with ammonium sulphate and rare earth salts as in Example I (it is identified as NR) was dried to 85% VF. The dried product (NRD) was re-exchanged with rare earth salt as in Example I to produce a zeolite of the type NRDR. The zeolite was again dried to a VF of 85% and again re-exchanged as above. The sample is identified as $NR(DR)_2$. The latter sample was again dried to a VF of 85% and again re-exchanged as above and is identified as $NR(DR)_3$.

TABLE III

| Description of Exchanged Zeolite | NR | NRDR | $NR(DR)_2$ | $NR(DR)_3$ |
|---|---|---|---|---|
| % VF | | 84 | 85 | 85 |
| $Na_2O$ (%) | 3.79 | 2.29 | 0.74 | 0.31 |
| REO (%) | 8.90 | 15.18 | 18.99 | 21.25 |
| $NH_3$ (%) | 2.44 | 1.01 | 0.47 | 0.33 |
| % $Na_2O$ reduction | | 40% | 68% | 58% |

It will be seen that in each step in going from NR to NRDR to $NR(DR)_2$ to $NR(DR)_3$, the percent of the sodium in the product prior to drying remaining after subsequent exchange, about 40% to 70% depending on the $Na_2O$ content of the dried sample prior to exchange, as appears in Table III.

The following examples illustrate our discovery that the limited dehydration according to our invention will not attain the sodium reduction in subsequent exchange where the preliminary exchange prior to drying is with ammonium ion only, notwithstanding the nature of the ion employed in the exchange step following the drying step.

EXAMPLE VI

The sodium Y ($a_o$ = 24.60 Å containing 14.7% $Na_2O$ (VF basis) was exchanged with ammonium sulfate at ambient temperature. The exchanged zeolite was removed from the mother liquor by filtration and washed. The washed filter cake was again similarly exchanged and washed, and this was repeated again. The triple exchanged zeolite was dried and is designated $N_3D$. It had the composition and properties as tabulated in Table IV. The dried product was re-exchanged with ammonium sulfate and separated from the mother liquor and thoroughly washed. The product had the properties shown in Table IV.

EXAMPLE VII

The zeolite of Example VI was exchanged at ambient temperature with rare earth chloride solution. The exchanged zeolite was separated from its mother liquor and washed thoroughly. The product so produced was dried and to reduce its moisture content. The product was re-exchanged with the rare earth salt solution and the separated zeolite again thoroughly washed. It is designated as RDR in Table IV.

TABLE IV

| Product | N₃D | N₃DN | RD | RDR | RDN |
|---|---|---|---|---|---|
| % VF | 86.7 | | 85.2 | | |
| % WF | 92.0 | | 85.2 | | |
| % Na₂O | 4.22 | 3.78 | 7.33 | 2.61 | 2.11 |
| % NH₃ | 5.96 | 6.27 | | | |
| % reduction in |  |  |  |  |  |
| % Na₂O | | 10.0 | | 58.0 | 61.0 |

The difference in the percent reduction in the case of the N₃D, notwithstanding the higher value of the percent WF as compared with the RD sample confirms the observation of the value of a preliminary exchange with rare earth cation as compared with NH₄+ cation.

The data in the following example is consistant with the view that the moisture in a wet zeolite, for example, the partially exchanged Y zeolites of the previous examples, is held by force of more than one type and that by drying to about 85-90% VF, the water removed by drying is held under substantially different forces than are the moisture remaining after drying to the indicated range. Because of the response to heat of the moisture which remains after the degree of drying up to about 85% to 90% VF is so substantially different, we have designated the moisture which is removed up to about 85% to 90% VF as free water.

The moisture removed in heating to remove moisture to reduce the moisture content to less than about 10 to 15%, by weight, i.e. above about 90% VF requires a substantially greater temperature increase and results in a substantially smaller percent of change in water content (%VM) per degree temperature rise, than for the removal of the water in the region up to about 85% to 90% VF. This observation is consistent with the view that the water removed in drying above about 85% to 90% VF is held under substantially greater forces requiring a substantially greater energy input to remove the water than is required in drying to about 90% VF. This view is consistent with the nature of the forces which hold the water adsorbed in the pores and the water of hydration of the ions in exchange position in the pores which are removed by calcination to percent VM substantially less than about 10 to 15% VM. For purposes of identification of this moisture, they are referred to as pore water. The water removed by moderate heating that is sufficient to supply the specific heat and latent heat at the pressure indicated of moisture which is present as interstitial water is the water referred to here as free water.

Thus by removing substantially only free water, accoording to our invention, a single following exchange can remove up to about 75% of the sodium content of the dried zeolite, which has been exchanged with a rare earth cation and by repeated drying to remove free water, and re-exchange the sodium content may be reduced to substantially less than 1% of the zeolite expressed as the equivalent Na₂O on a volatile free basis.

The following example illustrate that the transition point where any further heating of the dried zeolite results in the removal of pore water is in the range of about 85% to about 90% VF. During such heating the free water is removed and further heating beyond about 90% removes "pore water".

EXAMPLE VIII

A number of samples were prepared using a sodium Y having the following nominal analysis:

Na₂O (13.8%):SiO₂ (65.3%):Al₂O₃ (21.2%)

was exchanged with rare earth salt solution to reduce the sodium content to 7.3% expressed as Na₂O on a volatile free basis. The exchange was carried out at about 70° to 80° F.

The sample was subjected to thermogravametric analysis. The thermogravametric analysis gives the fraction of the weight of the sample lost and the weight of loss per minute at each temperature. Table V gives the results of the analysis of the exchanged sample of Example VII. The sample was placed in a chamber which is subjected to a vacuum as indicated and heated at gradually rising temperatures and the weight of the sample is determined as a function of time and temperature. The weight and temperature from which the weight loss in arriving at each temperature per unit of time is determined. The weight remaining (the VF) may be determined. The weight of the sample and its water content is thus known, i.e. its %VF is known. The apparatus employed in the thermogravimetric analysis was the DuPont 951 Thermogravimetric Analyzer (TGA) molule for the 990 Thermal Analyzer.

In the case of Example VIII, the weight of the sample subjected to thermogravimetric analysis was 13.7 milligrams. It was 74% volatile free and contained 26% water.

TABLE V

| T° C. | wt. remaining after heating in mg. | VF | T° C. | wt. remaining after heating in mg. | VF % |
|---|---|---|---|---|---|
| 40 | 13.43 | 75.5 | 45 | 0.35 | 76.3 |
| 50 | 13.11 | 77.3 | 55 | 12.85 | 78.3 |
| 60 | 12.74 | 79.6 | 65 | 12.52 | 80.8 |
| 70 | 12.33 | 82.2 | 75 | 12.14 | 83.5 |
| 80 | 11.99 | 84.6 | 85 | 11.82 | 85.8 |
| 90 | 11.69 | 86.7 | 95 | 11.98 | 87.6 |
| 100 | 11.47 | 88.4 | 105 | 11.40 | 88.9 |
| 110 | 11.33 | 89.5 | 115 | 11.28 | 89.9 |
| 120 | 11.24 | 90.2 | 125 | 11.21 | 90.5 |
| 130 | 11.18 | 90.7 | 135 | 11.15 | 90.9 |
| 140 | 11.13 | 91.2 | 145 | 11.11 | 91.3 |
| 150 | 11.10 | 91.4 | 155 | 11.07 | 91.6 |
| 160 | 11.06 | 91.7 | 165 | 11.03 | 91.9 |
| 170 | 11.00 | 92.2 | 175 | 10.99 | 92.3 |
| 180 | 10.97 | 92.4 | 185 | 10.96 | 92.5 |
| 190 | 10.95 | 92.6 | 195 | 10.93 | 92.8 |
| 200 | 10.92 | 92.9 | 205 | 10.91 | 93.0 |
| 210 | 10.90 | 93.1 | 220 | 10.88 | 93.2 |
| 230 | 10.87 | 93.3 | 240 | 10.86 | 93.4 |
| 250 | 10.87 | 93.5 | 260 | 10.86 | 93.5 |
| 290 | 10.84 | 93.6 | 700 | 10.80 | 93.9 |

Figure 3:
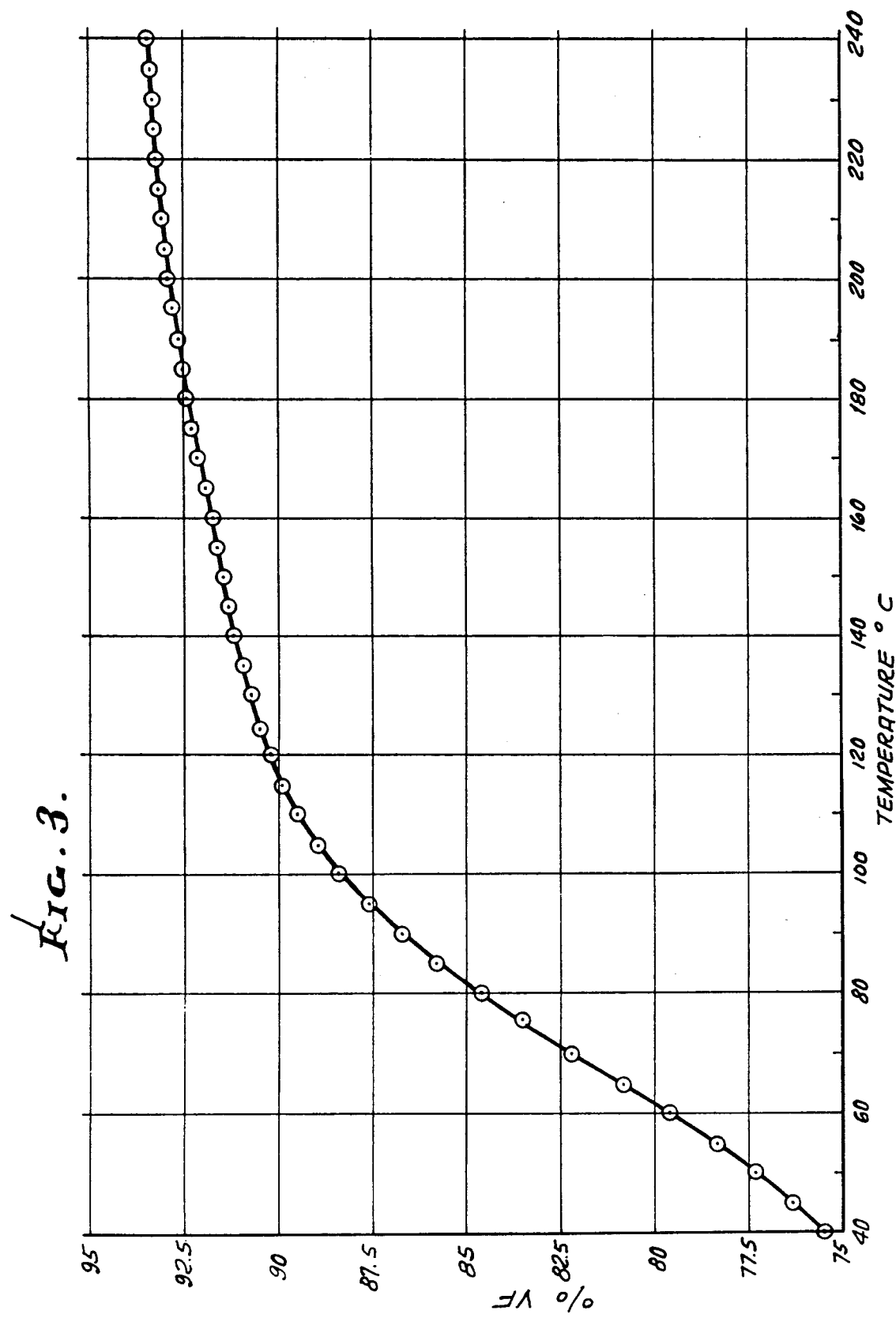

Table V tabulates and FIG. 3 plots the data obtained in terms of values of %VF attained at each temperature. FIG. 3 plots the value of the %VF as a function of temperature.

It will be seen that there is an abrupt change in the slope of the curves at 120° to 130° C. corresponding to a %VF of about 90%.

In the region below about 80% VF to 85% VF, the VF% changes approximately 0.25% VF per centigrade degree change, while in the region above 90%, i.e. in the range of 90% VF to 91.5% VF. The rate is about 0.0125% VF per degree C., and in the region of above about 91.5% VF the change in %VF per degree rise in temperature drops to less than 10% of the rate in the region of 90-91.5% VF and less than 5% of the % change of VF per degree change of the temperature in the region below 85% VF.

It appears that the water evaporated below about 90% VF is held in a substantially different manner under substantially lesser forces than the water removed above about 90% VF. In the above experiment the water removed in going to 90% VF was 68% of the total water in the sample.

Because this water is removed first, we have designated it as interstitial or free water. The remaining water requires a considerably higher temperature rise for its removal and at a substantially lower fraction of the original water per °C. temperature rise is water which requires substantially greater energy input to cause its removal. While we do not wish to be bound by any theory of the nature of these two types of water, the observed facts confirm the pervious observation and are consistent with the conclusions that the water removed in drying above about 90% VF is water contained in the pores of the zeolite as adsorbed water and water of hydration of the cations in the exchange position.

It is therefor our invention to exchange a sodium containing crystalline alumino silicate to reduce the sodium content to less than about ⅓ of the sodium content of the unexchanged sodium zeolite, preferably in the range of about ¼ to ⅓ of the sodium content of the zeolite with a rare earth cation either alone or with a rare earth cation and another cation prior to drying. The exchanged zeolite is then separated from the remaining salt solution as for example by filtration and the filter cake is washed to remove the excess salt remaining in the filter cake. In the usual case the filter cake may contain 30% or less of water, i.e. a %VM of 30 or less, i.e. a %VF of 70 or more. The filter cake is heated to partially dry the filter cake. The heating is sufficient to remove free water without any subtantial removal of pore water. This is accomplished according to our invention by drying in the range of about 85% to 90% VF without calcining the zeolite. The dried zeolite is then re-exchanged with any selected cation to further reduce the sodium content by about 40% to about 75% of the sodium content of the dried product.

The salts of cations which may be used in exchanging the sodium may be in addition to rare earth cations any one of the salts which have been used in the prior art for exchanging sodium. These include the acids and salts of acids other than the salts of the alkali metal cations. Such cations include the monovalent cations, H and NH4 and the polyvalent metal cations of the Periodic system. These may be used in single or multiple exchanges, either with the same or different cations. All of the exchanges may and preferably are carried out at ambient temperature, i.e. about 70° F.±70° F. with a monovalent cation, for example NH4.

In our presently preferred embodiment, we treat a sodium Y as above with rare earth cations with or without exchanging also with NH4+ and dry the exchanged zeolite to reduce the VM, i.e. to increase the VF, of the exchanged zeolite in the range of about 85% VF to about 90% VF. The preliminary and also subsequent exchange may be a single or multiple exchange with rare earth salts or with NH4+ and rare earth in sequence with intermediate filtration and washing, to reduce the sodium content expressed as the equivalent $Na_2O$ based on the zeolite on a volatile free basis, in the range of 3.5% to about 7.5% and after drying to re-exchange to reduce the $Na_2O$ content to a range of about 2.57% to about 0.5% or less.

APPENDIX

MICRO-ACTIVITY TEST

A test oil (ASTM Subcommittee D-32, Standard FHC 893) is vaporized and passed through a bed of microspheres produced by spray drying of the catalyst. Spray dried microspheres of the catalyst are of a particle size within the range of 50–70 microns.

The catalyst charge is 4.00±0.05 grams and 1.33±0.03 grams of oil is passed through the catalyst bed over a period of 75 seconds. The catalyst is prepared by heating a shallow bed of the catalyst for three (3) hours in air at 1050° F. and then steamed for two (2) hours at 1450° F. and another sample is steamed at 1500° F. for two (2) hours and another sample is steamed at 1550° F. for two (2) hours. The oil passed through a preheat zone and through a bed of the microspheres maintained at a temperature of 900°±2° F. at a weight hourly space velocity (WHSV) of 16.

The vapors and gases passing from the bed are condensed in an ice bath and the uncondensed gases collected over water.

The following observations are made. The weight of the condensate and the volume and temperature of the gases are determined. The liquid condensate fraction is analyzed and the percent by weight of the liquid fraction which is boiled above 421° F. is determined. The volume and temperature of the gases collected over the water are measured and the volume reduced to standard conditions. The uncondensed gases are analyzed and the weight percent of the gases which is hydrogen, isopentane, and hexanes is determined and their weight percent of the feed determined. The weight percent of the liquid charge is determined from the following relation:

F is the weight of the oil passing through the reactor;
L is the weight of the liquid product which is collected as condensate;
R is the percent by weight of the fraction of the liquid condensate which boils above 421° F.;
H is the grams of liquid held up in the reactor exit line and around the reactor, receiver and joints.

In the above test it has been determined that it constitutes three percent of the feed F. The weight percent conversion (%C) is given by the following relationship.

$$\% C = \frac{F - \frac{R \times L}{100} - H}{F}$$

The conversion using the catalyst steamed at 1450° F. is termed M conversion, the one steamed at 1500° F. is termed S conversion, and the one steamed at 1550° F. is termed S+ conversion.

We claim:

1. In a two-stage process for reducing the sodium ion content of a zeolite having exchangeable sodium ion content by reacting in a first stage the sodium-containing zeolite with an aqueous solution of a rare earth metal cation to partially exchange a portion of the sodium with rare earth metal cations, followed by a thermal treatment of the partially exchanged zeolite, reacting in a second stage the partially exchanged and thermally treated zeolite with an aqueous solution of a metal cation other than sodium to exchange additional sodium ions present in the partially exchanged and thermally treated zeolite, the improvement which comprises conducting the thermal treatment of the partially exchanged zeolite within the temperature range from about 80° C. to about 120° C. for a time sufficient to remove only the free water content of the partially exchanged zeolite to a volatile free (VF) level within the range of about 85–90% without removal of its pore water content and alteration of the unit cell dimension ($A_o$) of the zeolite, followed by a second stage sodium ion exchange at ambient temperature to provide a zeolite which has a sodium ion content from about 40% to about 70% lower than the sodium ion content of the zeolite exchanged and thermally treated in the first stage.

2. The process of claim 1, wherein the zeolite is a Y zeolite.

3. The process of claim 1, wherein the exchangeable sodium content of the zeolite prior to the two-stage exchange process is in excess of about 3.5% by weight (expressed as the equivalent $Na_2O$), and wherein in the first exchange stage the sodium content is reduced to less than about one half of the original sodium content, and wherein after the thermal treatment in the second stage exchange process the residual sodium content is reduced to a level which is from about 40 to about 70% lower than the sodium content of the thermally treated zeolite.

* * * * *